(12) United States Patent
Moran et al.

(10) Patent No.: US 10,220,856 B2
(45) Date of Patent: *Mar. 5, 2019

(54) METHOD AND SYSTEM FOR VEHICLE ESC SYSTEM USING MAP DATA

(71) Applicant: HERE Global B.V., Eindhoven (NL)

(72) Inventors: Kevin Moran, West Dundee, IL (US); Robert Denaro, Long Grove, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/342,840

(22) Filed: Nov. 3, 2016

(65) Prior Publication Data

US 2017/0066451 A1   Mar. 9, 2017

Related U.S. Application Data

(60) Continuation of application No. 15/060,951, filed on Mar. 4, 2016, now Pat. No. 9,499,166, which is a (Continued)

(51) Int. Cl.
*G01M 17/00* (2006.01)
*G06F 7/00* (2006.01)
(Continued)

(52) U.S. Cl.
CPC ....... *B60W 50/0098* (2013.01); *B60T 8/1755* (2013.01); *B60W 30/02* (2013.01);
(Continued)

(58) Field of Classification Search
CPC ............... B60K 31/0066; B60K 28/16; B60W 2550/143; B60W 2520/125;
(Continued)

(56) References Cited

U.S. PATENT DOCUMENTS 5,995,895 A * 11/1999 Watt ..................... A01B 79/005
56/10.2 G
6,092,014 A    7/2000 Okada
(Continued)

FOREIGN PATENT DOCUMENTS

DE   19649137 A1   6/1997
DE   10222199 A1   11/2003
(Continued)

OTHER PUBLICATIONS

European Office Action for related European Application No. 11 161 017.6 dated Sep. 14, 2017.
(Continued)

*Primary Examiner* — Harry Y Oh
(74) *Attorney, Agent, or Firm* — Lempia Summerfield Katz LLC

(57) ABSTRACT

An Electronic Stability Control (ESC) system for a vehicle is disclosed. An electronic control unit (ECU) is programmed to reduce vehicle lateral skidding by reducing differences between an intended vehicle direction and/or yaw rate and an actual vehicle direction and/or yaw rate by applying modifications to operation of the vehicle brakes and/or throttle. The ESC system receives inputs from wheel speed sensors, a steering wheel position sensor, a yaw rate sensor and a lateral acceleration sensor. The ESC system also receives input that indicates at least a property of the road upon which the vehicle is located, wherein the road upon which the vehicle is located is determined from a positioning system that uses a map database and the property is determined from the map database. The ESC system incorporates the road property information in determining when and/or how to modify operation of the vehicle to reduce vehicle skidding.

29 Claims, 12 Drawing Sheets

Related U.S. Application Data division of application No. 14/101,780, filed on Dec. 10, 2013, now Pat. No. 9,302,659, which is a division of application No. 12/798,758, filed on Apr. 9, 2010, now Pat. No. 8,630,779.

(51) Int. Cl.

| | | |
|---|---|---|
| *G06F 19/00* | (2018.01) | |
| *B60W 50/00* | (2006.01) | |
| *B60T 8/1755* | (2006.01) | |
| *B60W 30/02* | (2012.01) | |
| *B60W 30/18* | (2012.01) | |
| *B60W 10/04* | (2006.01) | |
| *B60W 10/10* | (2012.01) | |
| *B60W 10/184* | (2012.01) | |
| *B60W 10/20* | (2006.01) | |
| *B60W 10/22* | (2006.01) | |

(52) U.S. Cl.
CPC ............... *B60W 30/18118* (2013.01); *B60W 30/18172* (2013.01); *B60W 50/0097* (2013.01); *B60T 2210/22* (2013.01); *B60T 2210/36* (2013.01); *B60W 10/04* (2013.01); *B60W 10/10* (2013.01); *B60W 10/184* (2013.01); *B60W 10/20* (2013.01); *B60W 10/22* (2013.01); *B60W 2540/22* (2013.01); *B60W 2550/14* (2013.01); *B60W 2550/20* (2013.01); *B60W 2550/402* (2013.01)

(58) Field of Classification Search
CPC ....... B60W 2550/14; B60W 2550/402; B60W 30/02; B60T 2210/22; B60T 2210/36
USPC .......................................................... 701/29
See application file for complete search history.

(56) References Cited

U.S. PATENT DOCUMENTS

| | | | | |
|---|---|---|---|---|
| 6,208,927 B1* | 3/2001 | Mine | ................... | B60K 31/0058 701/70 |
| 6,298,296 B1* | 10/2001 | Takahashi | .......... | B60K 31/0066 701/532 |
| 6,343,253 B1* | 1/2002 | Matsuura | ........... | B60K 31/0066 340/438 |
| 6,351,694 B1* | 2/2002 | Tseng | ..................... | B60T 8/172 180/197 |
| 6,385,528 B1* | 5/2002 | Takahashi | .......... | B60K 31/0066 701/70 |
| 6,401,023 B1* | 6/2002 | Takahashi | .......... | G01C 21/3697 340/441 |
| 6,424,904 B1* | 7/2002 | Takahashi | .......... | B60K 31/0083 340/441 |
| 6,675,090 B2* | 1/2004 | Matsuura | .......... | B60K 31/0066 701/400 |
| 6,725,145 B1* | 4/2004 | Takahashi | .......... | B60K 31/0075 340/438 |
| 6,778,896 B1* | 8/2004 | Matsuura | .......... | B60K 31/0066 701/70 |
| 6,873,898 B1* | 3/2005 | Kostadina | .............. | B60K 28/16 340/539.28 |
| 7,260,465 B2 | 8/2007 | Waldis et al. | | |
| 7,537,223 B2* | 5/2009 | Zetterstroem | .......... | B60G 3/265 280/5.52 |
| 7,747,359 B2* | 6/2010 | Katrak | ................. | G05D 1/0891 180/204 |
| 2002/0052681 A1* | 5/2002 | Matsuno | ............ | B60K 23/0808 701/70 |
| 2002/0184236 A1 | 12/2002 | Donath et al. | | |
| 2003/0065432 A1 | 4/2003 | Shuman et al. | | |
| 2004/0107042 A1* | 6/2004 | Seick | ................... | G08G 1/0104 701/117 |
| 2004/0206570 A1 | 10/2004 | Tajima et al. | | |
| 2004/0249542 A1 | 12/2004 | Murasugi et al. | | |
| 2005/0149251 A1 | 7/2005 | Donath et al. | | |
| 2005/0206236 A1 | 9/2005 | Mori et al. | | |
| 2007/0005609 A1* | 1/2007 | Breed | ................... | B60N 2/2863 |
| 2007/0032943 A1* | 2/2007 | Okabe | ................. | B60T 8/17558 701/532 |
| 2008/0117035 A1 | 5/2008 | Lu et al. | | |
| 2008/0208424 A1 | 8/2008 | Hartman | | |
| 2009/0140887 A1* | 6/2009 | Breed | ................... | G01C 21/165 340/990 |
| 2009/0187322 A1* | 7/2009 | Yasui | .................... | B60W 10/06 701/70 |
| 2009/0300067 A1* | 12/2009 | Denaro | ............... | B60W 40/072 |
| 2009/0319095 A1* | 12/2009 | Cech | ...................... | B60K 35/00 701/1 |
| 2010/0049400 A1 | 2/2010 | Duraiswamy et al. | | |
| 2010/0082212 A1* | 4/2010 | Miyajima | .......... | B60K 31/0066 701/70 |
| 2010/0204896 A1* | 8/2010 | Biondo | ............... | B60W 30/143 701/93 |
| 2010/0228427 A1 | 9/2010 | Anderson et al. | | |
| 2011/0089255 A1* | 4/2011 | Kolich | .................... | A61L 9/125 239/34 |
| 2012/0265431 A1* | 10/2012 | Hayakawa | ............... | B60T 7/22 701/301 |
| 2016/0328968 A1* | 11/2016 | Elsheemy | ............... | G01S 19/13 |

FOREIGN PATENT DOCUMENTS

| | | |
|---|---|---|
| DE | 102006036310 A1 | 2/2007 |
| EP | 2022693 A1 | 2/2009 |
| EP | 2085280 A2 | 8/2009 |
| EP | 2165896 A1 | 3/2010 |
| JP | H05155275 A | 6/1993 |
| JP | H09507816 A | 8/1997 |
| JP | 2002046509 A | 2/2002 |
| JP | 2002120711 A | 4/2002 |
| JP | 2003063373 A | 3/2003 |
| JP | 2004168154 A | 6/2004 |
| JP | 2004347062 A | 12/2004 |
| JP | 2005254943 A | 9/2005 |
| JP | 2005297945 A | 10/2005 |
| JP | 2006175899 A | 7/2006 |
| JP | 2006347528 A | 12/2006 |
| JP | 2007001579 A | 1/2007 |
| JP | 2008100679 A | 5/2008 |
| JP | 2009143433 A | 7/2009 |
| JP | 2009184504 A | 8/2009 |
| JP | 2009269594 A | 11/2009 |
| JP | 2010076697 A | 4/2010 |
| WO | WO9637375 A1 | 11/1996 |
| WO | WO2006037445 A1 | 4/2006 |

OTHER PUBLICATIONS

Japanese Office Action for related Japanese Application No. 2016-035851 dated May 29, 2017, with English Translation.
European Office Action cited in EP11161017.6, dated Nov. 11, 2015.
European Patent Office office action from EP Application No. 11161017.6, dated Jan. 8, 2013.
European Search Report for EP Application No. 11161017.6, dated Jul. 20, 2011.
European Search Report for related European Application No. 11 161 017.6 dated Jul. 15, 2016.
Japanese Office Action cited in JP2011-098721, dated Apr. 6, 2015.
Japanese Office Action cited in JP2011-98721, dated Oct. 20, 2015.
Japanese office Action for related Japanese Application No. 2016-035851 dated Sep. 20, 2016, with English Translation.
Japanese Preappeal Review Report for related application No. 2011-098721, dated May 6, 2016 with English Translation.
Office Action in European Patent Application No. 11 161 017.6, dated Jan. 28, 2015, 4 pages.

(56) References Cited

OTHER PUBLICATIONS

Japanese Office Action for related Japanese Application No. 2016-035851 dated Dec. 11, 2017, with English Translation.

* cited by examiner (ALTERNATIVE 1)

(ALTERNATIVE 2)

PRIMARY LANE DEVIATION PEAK,
POSITIVE BANK, 60 MPH

PRIMARY LANE DEVIATION PEAK,
POSITIVE BANK, 56 MPH

FIG. 9

Table 1: Banked curve ESC performance metrics

| | | ESC | | ADAS | | Significance | |
|---|---|---|---|---|---|---|---|
| | Speed | Mean | Std Dev | Mean | Std Dev | F-value | p-value |
| RMS Yaw Rate Error (deg/s) | 60 mph | 3.6 | 0.6 | 3.1 | 0.7 | 20.21 | <.0001 |
| | 58 mph | 3.3 | 0.56 | 2.8 | 0.7 | 20.29 | <.0001 |
| | 56 mph | 3 | 0.56 | 2.6 | 0.67 | 11.65 | 0.0009 |
| | 54 mph | 2.7 | 0.51 | 2.3 | 0.64 | 14.36 | 0.0002 |
| RMS Slip Angle (deg) | 60 mph | 4.1 | 0.5 | 3.9 | 0.6 | 3.5 | 0.06 |
| | 58 mph | 3.9 | 0.57 | 3.7 | 0.64 | 2.44 | 0.12 |
| | 56 mph | 3.6 | 0.62 | 3.4 | 0.67 | 2.21 | 0.14 |
| | 54 mph | 3.3 | 0.67 | 3.2 | 0.71 | 0.47 | 0.49 |
| RMS Lane Deviation (ft) | 60 mph | 10 | 5.3 | 8.8 | 4.7 | 1.7 | 0.19 |
| | 58 mph | 8.9 | 5.4 | 7.6 | 4.7 | 2.12 | 0.15 |
| | 56 mph | 7.7 | 5.4 | 6.6 | 4.5 | 1.67 | 0.19 |
| | 54 mph | 5.6 | 3.7 | 5.2 | 3.2 | 0.44 | 0.51 |
| Lane Deviation Decay | 60 mph | -0.081 | 0.02 | -0.077 | 0.02 | 1.1 | 0.3 |
| | 58 mph | -0.081 | 0.03 | -0.074 | 0.03 | 1.76 | 0.19 |
| | 56 mph | -0.077 | 0.034 | -0.069 | 0.031 | 1.84 | 0.18 |
| | 54 mph | -0.067 | 0.038 | -0.065 | 0.035 | 0.08 | 0.78 |

RMS SLIP ANGLE, POSITIVE BANK

RMS YAW RATE ERROR, POSITIVE BANK

MINIMUM EVENT VELOCITY, POSITIVE BANK

PRIMARY LANE DEVIATION PEAK, POSITIVE BANK

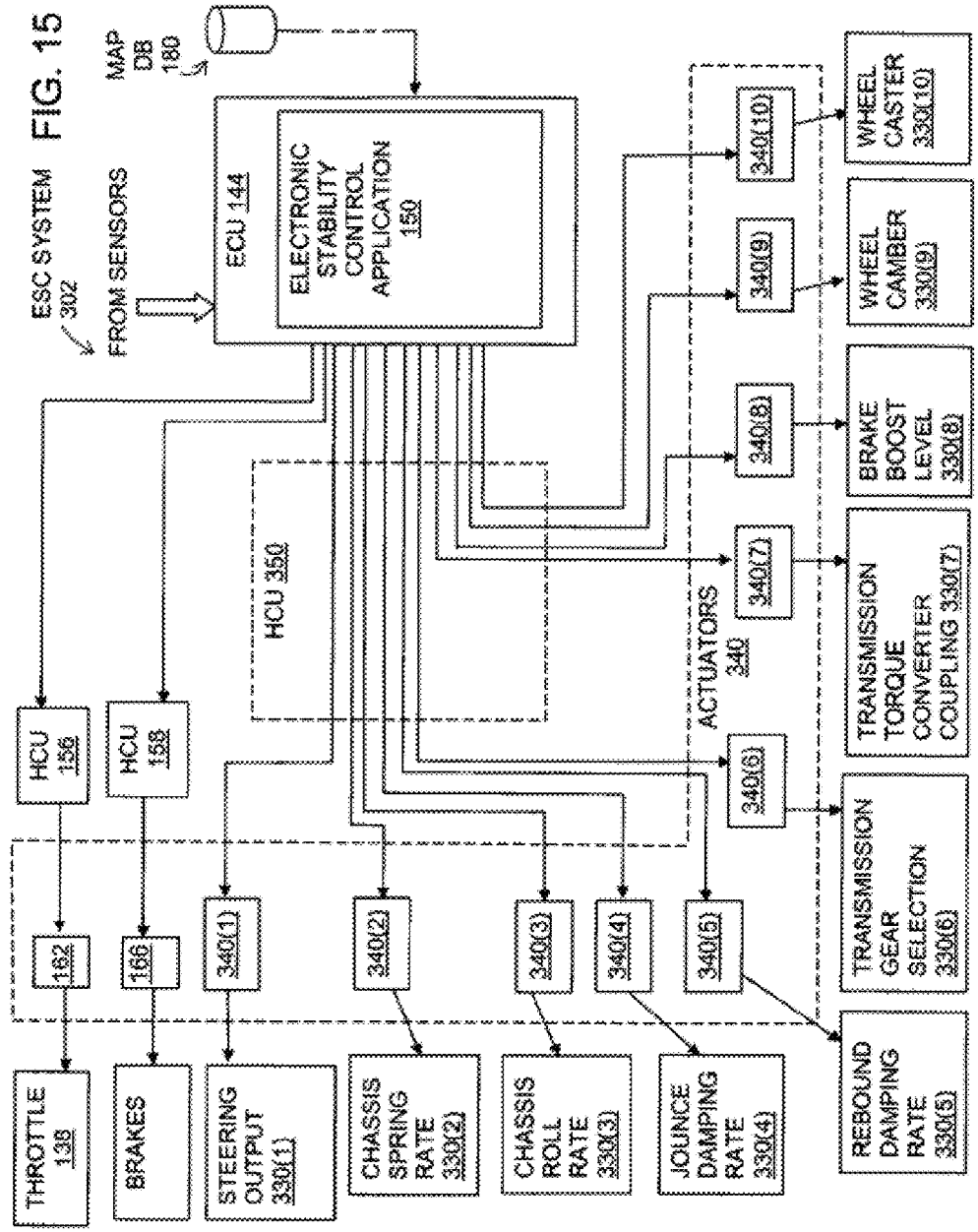

METHOD AND SYSTEM FOR VEHICLE ESC SYSTEM USING MAP DATA

REFERENCE TO RELATED APPLICATIONS

This application is a continuation under 37 C.F.R. § 1.53(b) of U.S. patent application Ser. No. 15/060,951 filed Mar. 4, 2016 now U.S. Pat. No. 9,499,166, which is a divisional under 37 C.F.R. § 1.53(b) of U.S. patent application Ser. No. 14/101,780 filed Dec. 10, 2013 now U.S. Pat. No. 9,302,659, which is a continuation under 37 C.F.R. § 1.53(b) of U.S. patent application Ser. No. 12/798,758 filed Apr. 9, 2010 now U.S. Pat. No. 8,630,779, the entire disclosures of which are hereby incorporated by reference.

BACKGROUND

The present invention relates to Electronic Stability Control systems for vehicles.

Electronic stability control (ESC) systems are a powerful safety addition to modern vehicles. ESC systems help drivers maintain control under compromising road conditions, challenging maneuvers and variations in driver responses or abilities. Many vehicle models being manufactured today have installed ESC systems as standard equipment. It is expected that ESC systems will become even more widely used in the future.

ESC systems are a computer-based technology that detects and reduces lateral vehicle skidding. An ESC system detects a loss of vehicle steering control and then applies appropriate braking individually at each wheel to help direct the vehicle in accordance with the driver's steering wheel input. More specifically, electronic stability control (ESC) systems operate by individually actuating the wheel brakes to induce a yaw moment on the car for the purpose of improving stability and performance. In order for the ESC system to accomplish this, the ESC system analyzes what the car is actually doing, and what the car "should" be doing under ideal circumstances.

Conventional ESC instrumentation includes a steering wheel position sensor, a lateral accelerometer, wheel speed sensors, a yaw rate sensor, sensors for brake and throttle inputs, and an enable/disable switch. The actuation is managed by an electronic control unit (ECU) and a hydraulic control unit (HCU). The ESC system can actuate wheel brake pressure as well as engine throttle to affect the dynamics of the car.

ESC system design tries to assist the driver without either taking control away from the driver or overriding the driver's "feel" of the road. It is a feature of ESC systems that the driver should be able to feel some slip of the tires to know when to self-modulate the speed or steering. When the ESC system does activate, the character of the driver's response does not change. The ESC system intervention makes the driver's inputs more effective.

Although existing ESC systems provide useful benefits and advantages, there continues to be room for improvements.

SUMMARY

In view of the above, systems and methods are provided for an improved Electronic Stability Control (ESC) system for a vehicle. An electronic control unit (ECU) is programmed to reduce vehicle lateral skidding by reducing differences between an intended vehicle direction and/or yaw rate and an actual vehicle direction and/or yaw rate by applying modifications to operation of the vehicle brakes and throttle. The ESC system receives inputs from wheel speed sensors, a steering wheel position sensor, a yaw rate sensor and a lateral acceleration sensor. The ESC system also receives input that indicates at least a property of the road upon which the vehicle is located, wherein the road upon which the vehicle is located is determined from a positioning system that uses a map database and the property is determined from the map database. The ESC system uses the road property information in determining when and/or how to modify operation of the vehicle to reduce vehicle skidding.

Other systems, methods and features of the invention will be or will become apparent to one with skill in the art upon examination of the following figures and detailed description. It is intended that all such additional systems, methods, and features be included within this description, be within the scope of the invention, and be protected by the accompanying claims.

BRIEF DESCRIPTION OF THE DRAWINGS

The examples of the invention described below can be better understood with reference to the following figures. The components in the figures are not necessarily to scale, emphasis instead being placed upon illustrating the principles of the invention. In the figures, like reference numerals designate corresponding parts throughout the different views.

FIG. 9 is a table that that shows banked curve ESC performance metrics.

FIG. 15 is a diagram showing further embodiments of the Electronic Stability Control system of FIG. 1.

DETAILED DESCRIPTION OF THE PRESENTLY PREFERRED EMBODIMENTS

I. Electronic Stability Control System

Figure 1:
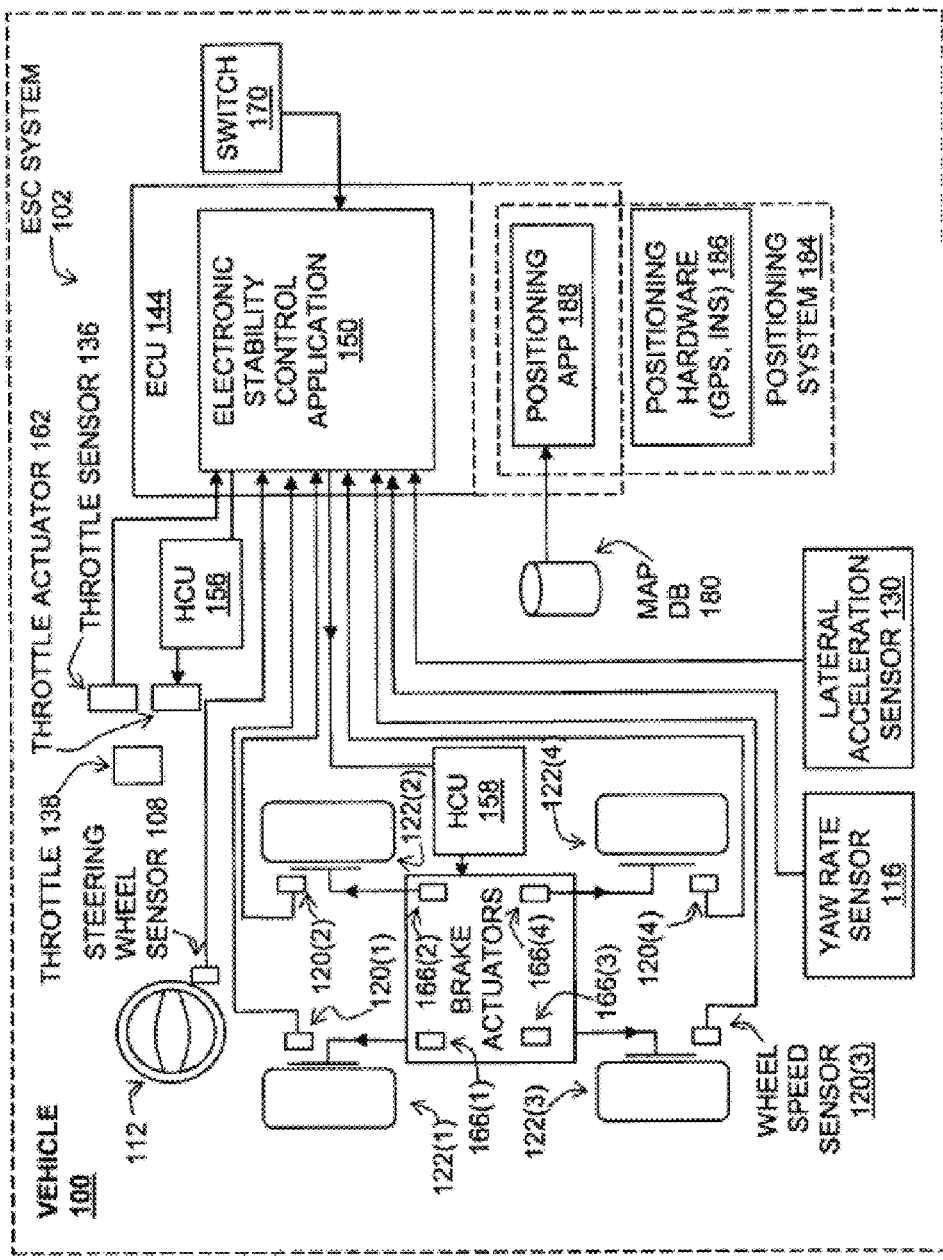
FIG. 1 is a diagram showing a vehicle with an Electronic Stability Control system according to an embodiment.

FIG. 1 shows a diagram of a vehicle 100 that includes a present embodiment of an Electronic Stability Control system 102. The ESC system 102 includes sensors that monitor certain vehicle operations, an ESC program that receives inputs from the sensors and determines modifications for the vehicle operation and outputs commands to actuators that apply the modifications. More specifically, included among the sensors of the ESC system 102 is a steering wheel sensor 108. The steering wheel sensor 108 determines the position (i.e., angle) of the vehicle steering wheel 112 and outputs a signal on a continuous or regular basis indicating the steering wheel position.

Also included among the sensors of the ESC system 102 is a yaw rate sensor 116. The yaw rate sensor 116 is located within the vehicle 100. The yaw rate sensor 116 measures the yaw rate of the vehicle 100 and provides an output signal indicative thereof. The yaw rate sensor 116 provides a signal indicating the vehicle yaw rate on a regular and/or continuous basis.

The ESC sensors also include wheel sensors 120(1), 120(2), 120(3) and 120(4). The wheel sensors 120(1), 120(2), 120(3) and 120(4) measure the speed (i.e., rotation) of each individual wheel, 122(1), 122(2), 122(3) and 122(4), respectively. Each wheel sensor provides an output signal indicating the respective wheel speed. The wheel sensors 120(1), 120(2), 120(3) and 120(4) provide output signals indicating the respective wheel speeds on a continuous and/or regular basis.

The ESC sensors also include a lateral acceleration sensor 130. The lateral acceleration sensor 130 is located within the vehicle 100. The lateral acceleration sensor 130 measures the lateral acceleration of the vehicle 100 and provides an output signal indicative thereof. The lateral acceleration sensor 130 provides a signal indicating the vehicle's lateral acceleration on a regular and/or continuous basis.

The ESC sensors also include a throttle sensor 136. The throttle sensor 136 measures the position and/or operation of the vehicle throttle 138. The throttle sensor 136 provides an output signal indicating the throttle position and/or operation on a continuous and/or regular basis.

The ESC system 102 may not necessarily include all the types of sensors indicated above. Alternatively, the ESC system 102 may include different sensors than those mentioned above, or may include other sensors in addition to those indicated above.

The ESC system 102 includes an electronic control unit (ECU) 144. The electronic control unit 144 may be a microprocessor or other computer hardware device capable of being programmed with software, firmware or otherwise. The electronic control unit 144 meets standard specifications for use and operation in vehicles.

The electronic control unit may be an application-specific integrated circuit ("ASIC"), digital signal processor, field programmable gate array ("FPGA"), digital circuit, analog circuit, a general processor, or combinations thereof. In one embodiment, the processor is one or more processors operable to control and/or communicate with the various electronics and logic of the associated components or devices.

The electronic control unit 144 runs an electronic stability control application 150. The electronic stability control application 150 is a program implemented in software or firmware. The electronic stability control application 150 executes program instructions to carry out the functions of the Electronic Stability Control system, as explained herein. The electronic stability control application 150 receives the signal inputs from the Electronic Stability Control system sensors. More specifically, the electronic stability control application 150 receives the signal outputs from the steering wheel sensor 108, the yaw rate sensor 116, the wheel sensors 120(1), 120(2), 120(3) and 120(4), the lateral acceleration sensor 130, and the throttle sensor 136.

The ESC system 102 includes actuators that carry out the commands determined by the ESC application 150 to modify operation of certain vehicle systems. As determined by the electronic stability control application 150, the ECU 144 provides signals to one or more hydraulic control units 156 and 158. The hydraulic control unit 156 controls operation of an actuator 162 associated with the vehicle throttle 138. The hydraulic control unit 158 controls the operation of actuators 166(1), 166(2), 166(3) and 166(4) each of which is associated with a brake associated with one of the respective wheels 122(1), 122(2), 122(3), and 122(4). By means of these actuators, the ESC system 102 can actuate wheel brake forces as well as engine throttle to affect the dynamics (i.e., operation and movement) of the vehicle 100.

The ESC system 102 includes an enable/disable switch 170. This switch 170 allows the driver to de-activate operation of the ESC system 102. The switch 170 may be mounted on an instrument panel of the vehicle 100. The enable/disable switch 170 is associated with a warning light or other indicator to inform the driver when the ESC system 102 has been de-activated.

In this embodiment, the ESC system 102 also includes a map database 180 and a positioning system 184. The map database 180 includes a data representation of the road network including data representing the roads upon which the vehicle 100 is traveling. In one embodiment, the data representation models each road as a series of road segments, where a road segment is that portion of a road between intersections (i.e., where the road connects with another road) or where a road ends. Alternatively, the map database 180 may represent the roads in the road network in any other manner. The map database 180 may be part of a navigation system, or may be used by a navigation system. However, in other embodiments, the map database is not necessarily used by a navigation system.

The map database 180 is stored in the vehicle on a suitable data storage medium, such as a hard drive, CD-ROM, DVD, flash drive, or other tangible media suitable to store data. The map database may also be located remotely from the vehicle and accessed via a wireless communications network. Alternatively, a portion of the map database may be located in the vehicle and another portion located remotely.

A suitable map database may be provided by a map developer company, such as NAVTEQ North America, LLC, located in Chicago, Ill.

The map database 180 includes data that represents the road network upon which the vehicle travels. In one embodiment, the map database 180 includes data that represents the road network throughout an entire country, such as the United States. Alternatively, the coverage area may correspond to several countries, such as the United States, Canada, and Mexico. According to another alternative, the coverage area of the map database may include only a portion of a country or region within a geographic area, such as a county, state, province, city, metropolitan area, a regularly-shaped area or an irregularly-shaped area. The map database 180 may represent all the roads within a covered geographic area or alternatively, the map database may represent only a portion of the roads within an area, e.g., controlled-access roads or high volume roads.

The positioning system 184 includes hardware and software that determines the position of the vehicle 100 on the road network. The positioning system 184 may include a Global Navigation Satellite System (GNSS) unit (such as GPS, Galileo, Glonass or Compass) and/or other positioning hardware 186, such as inertial sensors including gyros, accelerometers and inclinometers. The positioning system 184 may also include the wheel speed sensors 120. The positioning system 184 also includes a positioning application 188. The positioning application 188 is a software routine or program that uses information output by the positioning hardware 186 and the map database 180. The positioning application 188 determines the three dimensional position, velocity and direction of the vehicle along a road segment. The positioning application 188 may be installed, run or executed on the same electronic control unit 144 as the Electronic Stability Control application 150, or alternatively, the positioning application 188 may be installed, run or executed on a separate processor.

Figure 2:
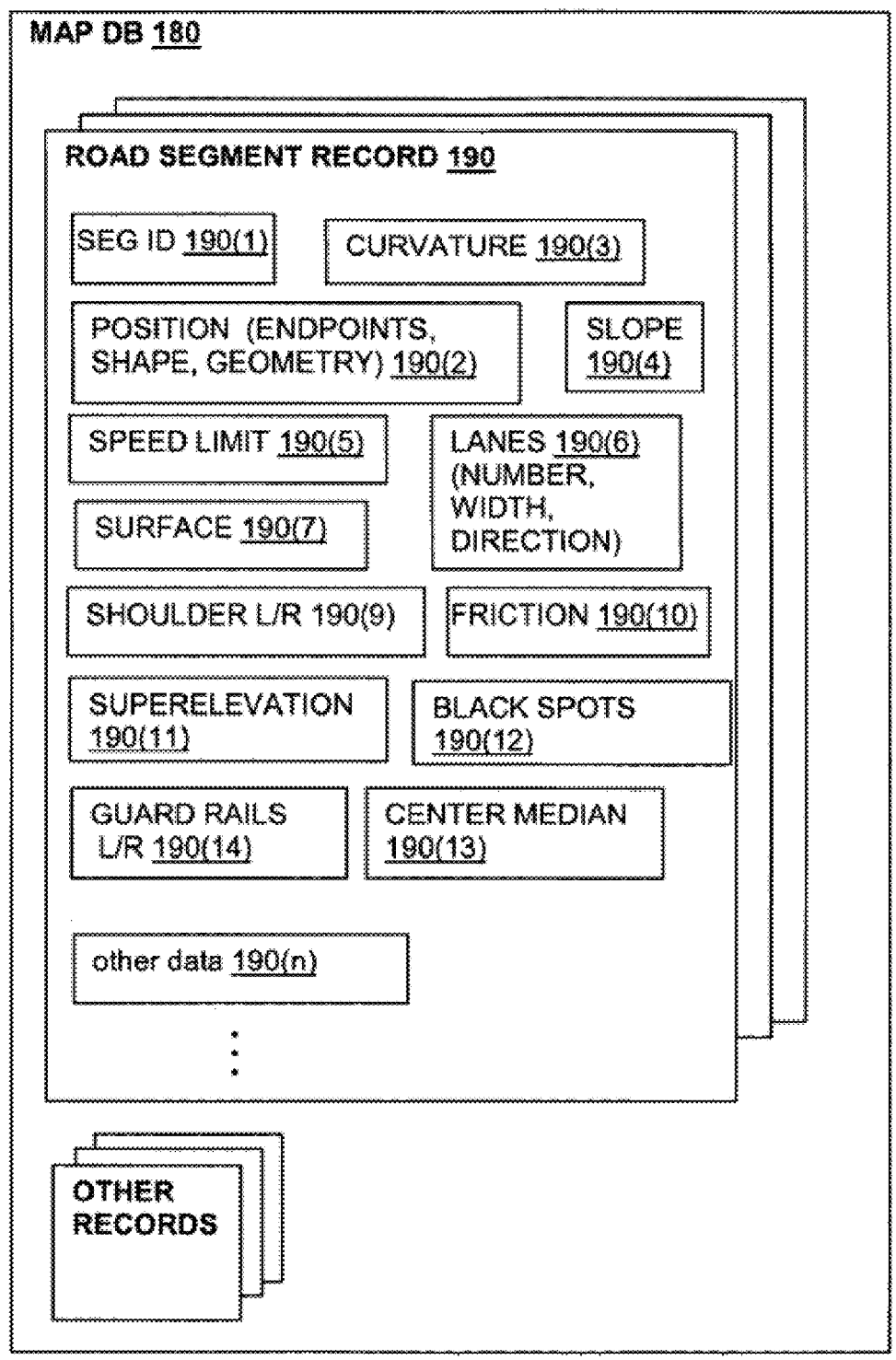
FIG. 2 is a diagram of components included in a database representation of a road included in the database in FIG. 1

FIG. 2 is a diagram that shows some of the data components that may be included in a data representation 190 of a road segment in the map database 180. Each data representation 190 of a road may include an ID 190(1) that uniquely identifies the data record. The data representation 190 of a road also includes information 190(2) about the position and shape of the road. The position information 190(2) may include the latitude, longitude, and altitude of the end points (e.g., nodes) of the road segment, and possibly, positions along the road segment between the end points (e.g., shape points or continuous equations).

In this embodiment, the representation of the road 190 includes information useful for operation of the ESC system 102. The following are some of the types of information about a road segment that may be included in the map database 180. It should be understood that an embodiment of the map database does not need to include all these types of data. It should also be understood that a map database may include other types of data, in addition to these. Further, the information about a road segment may indicate whether the information applies to the entire represented road segment or a portion of the road segment, whether the described property or feature changes along the represented road segment, where such change takes place and the property or feature on either side of the change.

Position and Shape (Geometry). The data representation of the road may include information 190(2) that indicates the position and shape (geometry) of the road. The geometry may be indicated for the entire road segment, or at various points along the road segment. This property of the road may be indicated by means of shape points, splines, clothoids, or other means or formulas.

Curvature. The data representation of the road may include information 190(3) that indicates the curvature or radius of curvature of the road. The curvature or radius of curvature may be indicated for the entire road segment, or at various points along the road segment. This property of the road may be indicated by means of shape points, splines, clothoids, or other means or formulas.

Height and Slope. The data representation of the road may also include information 190(4) that indicates the height and slope along of the road.

Speed limit. The data representation of the road may also include information 190(5) that indicates the speed limit along the road. This speed limit information may include whether the speed limit changes along the road, or whether the speed limit changes at different times or under different conditions (e.g., school zones).

Lanes and Lane width. The data representation of the road may also include information 190(6) that indicates the number and location of lanes along the road. The information may also indicate the width of each lane.

Road surface. One type of data that may be included is data that indicates the type of surface of the road. This type of information 190(7) may indicate whether the surface is paved, unpaved, cement, blacktop, gravel, grooved, etc.

Shoulders. The data representation of the road may also include information 190(9) that indicates whether shoulders exist along the road. This information may indicate whether a shoulder exists on both sides, or only one side of the road. This information may also indicate the size (i.e., width) of the shoulder, the type of surface of the shoulder, the length along the road that the shoulder is present, as well as other properties of the shoulder.

Friction. The data representation of the road may also include information 190(10) that indicates the frictional properties of the surface of the road. This may be indicated by frictional coefficient or other means.

Superelevation. The data representation of the road 190 may also include information 190(11) that indicates the superelevation (cross-slope) along the road.

Black Spots. The data representation of the road 190 may also include information 190(12) that indicates the locations of "black spots" along of the road. Black spots are locations of higher than normal accident rates. The black spot information 190(12) may indicate the specific location of a black spot along a road segment as well as the kind of accident condition associated with the black spot.

Medians. The data representation of the road may also include information 190(13) that indicates whether a median exists along a road. The information 190(13) may indicate the size and composition (e.g., concrete, landscaped) of the median. The information 190(13) may also indicate whether there are any passages through the median and where such passages are located.

Guard rails, medians and other roadside structures. The data representation of the road may also include information 190(14) that indicates whether any guard rails exist along a road and if so whether the guard rails are on the left, right or both sides of the road. The data representation of the road may also include any other structures along the road.

Other data. The types of data indicated above are not exclusive. There may be other kinds of data 190(n) associated with the representation of the road.

II. ESC Operation

Overview

Electronic stability control (ESC) systems operate by individually actuating the wheel brakes, and possibly other vehicle systems such as the throttle, to induce a yaw moment on the car for the purpose of improving stability and performance. For the ESC system to accomplish this, the system collects information about the car's actual operation and movement, and how the car "should" be operating and moving under ideal circumstances. Therefore, a certain amount of instrumentation is used, as well as an on-board dynamics model for making predictions. A comprehensive description of ESC system operation is given in the Bosch Automotive Handbook (6th Edition, 2004, ed. Robert Bosch GmbH.).

As stated above, the ESC system monitors and controls the difference between the measured yaw rate of the car and its ideal calculated yaw rate. The yaw rate gain equation can be used to estimate the yaw rate while traveling on a curve.

$$r_{unlimited} = \frac{\delta_f v_x}{L + K_u v_x^2}$$

where r is the yaw rate, $\delta_f$ is the front axle steer angle, $v_x$ is the longitudinal velocity, L is the wheelbase, and $K_u$ is the understeer gradient.

While this equation considers the particular understeer gradient, $K_u$, of the car, it does not take into account the friction of the road. There is a maximum achievable yaw rate that is based on the measured lateral acceleration and longitudinal speed.

$$r_{max} = -\frac{\alpha_y}{v_x}$$

where $\alpha_y$ is the lateral acceleration.

The formula for maximum yaw rate is implicitly dependent on the coefficient of friction. Given a friction coefficient of x, the car will begin slipping sideways when the lateral acceleration reaches x*g. Thus, the acceleration would not exceed the friction coefficient of the road. The revised yaw rate estimate takes the upper bound into account.

$$R_{est} = \min(|r_{unlimited}|, |r_{max}|) sgn(r_{unlimited})$$

An estimate of the yaw rate error is the difference between the measured value from the car's sensor and the estimated yaw rate.

$$r_{diff} = r_{meas} - r_{est}$$

However, the estimate does not include the dynamics of the lateral handling, so there are some lags that contribute to phase differences between the measured and estimated yaw rate. Some experimentation with filtering and differentiating the yaw rate difference signal results in an acceptable estimate for the purpose of triggering ESC activation.

When the yaw rate error exceeds a certain threshold, the ESC system activates and brakes are applied to individual wheels to create the desired yaw moment on the car. Excessive understeer causes the car to leave the intended path towards the outside of the curve; and the action of the ESC system is to apply the inside rear wheel brake to bring the car back into the lane. On the other hand, excessive oversteer causes the car to swerve to the inside of the intended path and possibly spin out. The action of the ESC system in this case is to apply the outside front wheel brake to counter the spin. Existing conventional ESC systems are not actually aware of the driver's intention, or of the shape of the road. Existing conventional systems react to a developing yaw rate error. It should be understood that existing conventional systems may employ other error signals in addition to yaw rate error, such as estimated slip angle error for example.

III. ESC Operation

Flowchart

Figure 3:
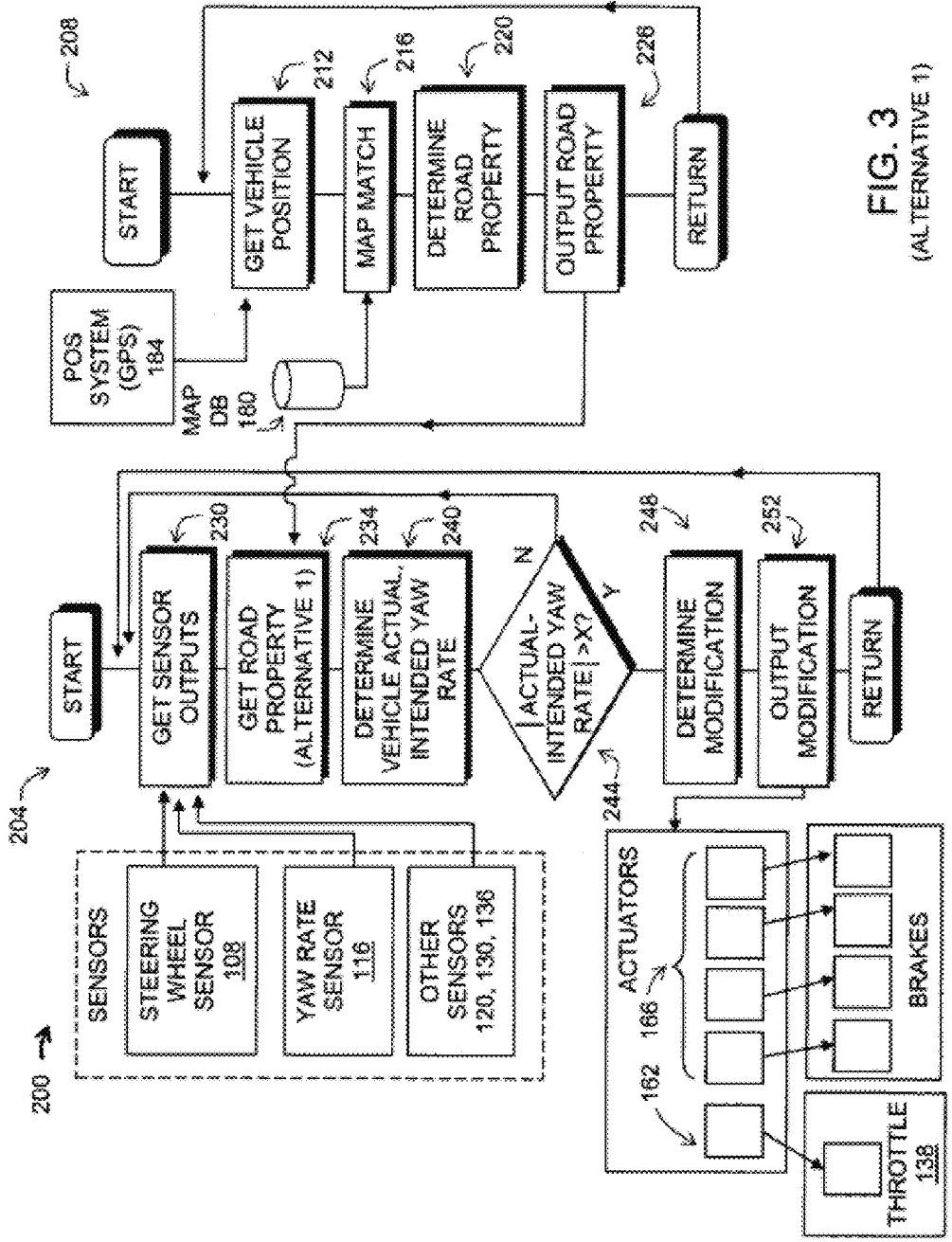
FIG. 3 is a flowchart of process performed by the Electronic Stability Control system of FIG. 1.

FIG. 3 is a flowchart that illustrates operation of a present embodiment of the ESC system 102 in FIG. 1. FIG. 3 shows a process 200 performed by the ESC system 102. In this embodiment, the process 200 includes two component processes. One component process 204 includes the steps performed by the ESC application 150 in FIG. 1. This component process 204 monitors vehicle operation and outputs commands to effect modifications to the vehicle operation. The other component process 208 includes steps performed by the positioning application 188 in FIG. 1. This component process 208 determines a vehicle position and properties of the road upon which the vehicle is traveling. In the present embodiment, the processes 204 and 208 operate in parallel. Further, in a present embodiment, the processes 204 and 208 operate continuously and loop, i.e., cycle back to perform their steps over and over while the vehicle is being operated.

Referring first to the positioning process 208, data from the positioning hardware 184 that indicates the vehicle position is obtained (Step 212). In this step, the input may be in the form of geographic coordinates. Alternatively, the input may include data from inertial sensors, wheel speed sensors (i.e., 120), or other hardware.

Using the information obtained from the positioning hardware 184, the positioning process 208 matches the vehicle position to a location along a road segment (Step 216). The process 208 uses the map database 180 for this purpose. The map matching step 216 may determine the exact current location of the vehicle along a road segment, including the direction the vehicle is heading and the lane in which the vehicle is located. In an alternative embodiment, the map matching step 218 may also determine a portion of the road network ahead of the vehicle. Determining a portion of the road network ahead of the vehicle may be accomplished using processes disclosed in U.S. Pat. Nos. 6,405,128 and 6,735,515, the entire disclosures of which are incorporated by reference herein. Using the technology disclosed in these patents and information from the map database, a data model of the road ahead of the vehicle is created, maintained and updated. The data model of the road extends out to an extent or threshold. The extent may be based on distance, time to travel, posted speed limits, actual vehicle speed, or other factors. For example, a distance extent may be 0.5 km, 1 km, 2 km, or other distances. If an intersection is located within the extent, the data model of the road ahead of the vehicle may also contain information on the multiple possible roads onto which the vehicle may travel. The data model may also identify a most-likely-path, which would be the one road of multiple possible roads that the vehicle is most likely to travel onto. Determination of the most-likely-path is described in the aforementioned patents.

Next, the positioning process 208 includes a step of determining a road property associated with the determined vehicle position (Step 220). The positioning process 208 obtains data from the map database 180 for this purpose. The road property may include any of those properties discussed above in connection with FIG. 2.

Once the positioning process determines the applicable road property associated with the location of the vehicle (and possibly ahead of the vehicle), it outputs this information to the ESC application 150 (Step 226). Then, the positioning process 208 starts again with the step of getting input indicating the vehicle position from the positioning hardware 184 (Step 212, again). The steps in the position process 208 are repeated while the vehicle is operated.

Referring now to the ESC process 204 in FIG. 3, this process 204 includes the step of obtaining inputs from the ESC sensors (Step 230). As stated above, the ESC sensors include those that indicate the actual vehicle operation and the intended vehicle operation. More specifically, these sensors may include the steering wheel sensor 108, the yaw rate sensor 116, the wheel speed sensors (collectively, 120), the lateral acceleration sensor 130 and the throttle sensor 136.

There are different ways that the ESC process 204 can use the road property information. Therefore, there are different stages in the ESC process 204 at which the road property information may be obtained. In the embodiment shown in FIG. 3, the ESC process 204 obtains the road property information that was output in step 226 of the positioning application process 208 (Step 234) before the step of determining the actual vehicle yaw rate and the intended vehicle yaw rate (Step 240). The ESC process 204 may obtain the road property information at this stage when the road property information is used as part of the step of determining the actual or intended yaw rates. Some examples of using the road property information in this way are described in sections that follow.

Next the ESC process 204 compares the actual and intended vehicle yaw rates (Step 244). If the difference between the actual vehicle yaw rate and the intended vehicle yaw rate does not exceed a threshold, the ESC process 204 returns to the step of obtaining the sensor inputs (Step 230, again) and the process 204 continues from there.

Returning to Step 244, if the difference between the actual vehicle yaw rate and the intended vehicle yaw rate exceeds a threshold, the ESC process 204 determines an appropriate modification (i.e., a recovery action) to the vehicle operation (Step 248). Then, the ESC process 204 provides an appropriate output (i.e., via the HCU) to the vehicle actuators, i.e., the throttle actuator 162 and/or the individual brake actuators 166(1), 166(2), 166(3), and 166(4) to affect the determined operation of the vehicle (Step 252). Then, the process 204 returns to obtain inputs from the sensors (Step 230) and the process continues as before.

Figure 4:
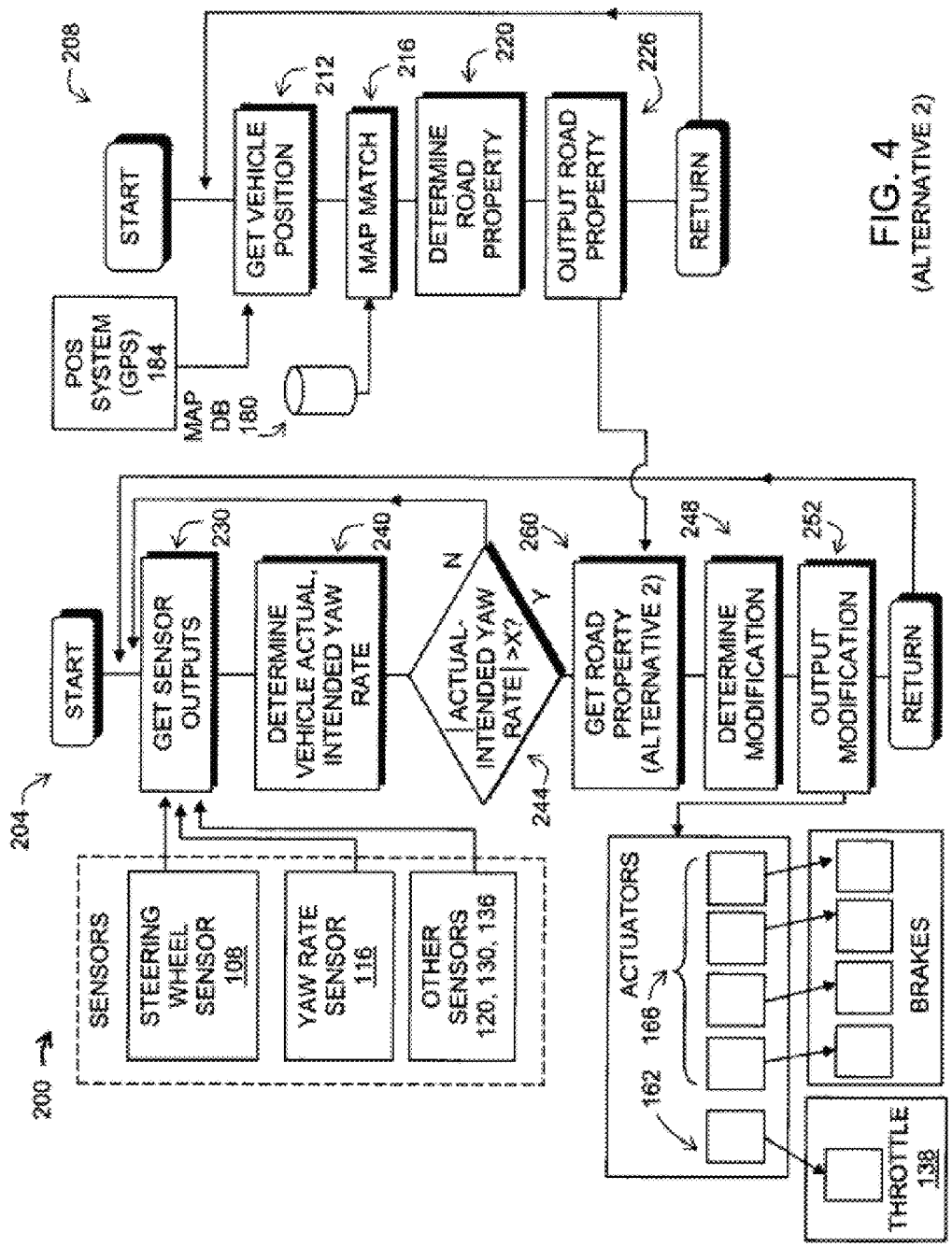
FIG. 4 is a flowchart of an alternative embodiment of the process performed by the Electronic Stability Control system of FIG. 1.

As mentioned above, there are different ways that the ESC process 204 can use the road property information and accordingly there are different stages in the ESC process 204 at which the road property information may be obtained. FIG. 4 shows an alternative embodiment of the ESC process 204. The ESC process 204 in FIG. 4 includes some of the same steps as the ESC process shown in FIG. 3, and like steps are indicated by the same numerals.

In FIG. 4, the ESC process 204 obtains the road property information from the positioning application process 208 after the determination is made (in Step 244) that the difference between the actual vehicle yaw rate and the intended vehicle yaw rate exceeds a threshold (Step 260). The ESC process 204 in FIG. 4 may obtain the road property information at this stage when the road property information is used as part of the step of determining the appropriate modification to make to the actual vehicle operation. Some examples of using the road property information in this way are described in sections that follow below.

In another alternative method of operation, the ESC process may use the road property information both for determining the actual or intended yaw rates and for determining the appropriate modification to make to the actual vehicle operation. (This method would be a combination of FIGS. 3 and 4.) In this alternative method of operation, the road property information may be obtained before the step of determining the actual or intended yaw rates and then retained for subsequent use the step of determining the appropriate modification to make to the actual vehicle operation. Alternatively, the road feature information may be obtained separately for these two functions.

IV. ESC Operation with Digital Map

As stated above, map information about features, properties or other aspects of the road network, such as those described in connection with FIG. 2, can be used by the ESC system in different ways. Some of the ways that map information can be used in the ESC system are described below.

Road geometry. As explained above, ESC systems use various sensor inputs, such as sensors associated with the steering wheel and throttle, to determine the driver's intention. Map information that indicates the road geometry, i.e., the shape of the road, including the shape of the road at the specific location of the vehicle as well as the shape of the road immediately ahead of the vehicle, can be used to help determine the driver's intention. For example, if map data indicates that the road upon which the vehicle is traveling is curved to the left, it would be expected that operation of the steering wheel by the driver to cause the vehicle to curve to the left would be intentional. On the other hand, if map data indicates that the road ahead of the vehicle is straight and the driver operation causes the vehicle to curve to the left, the ESC system could assume that the operation of the steering wheel might be unintentional (e.g., the driver is drowsy), or that the driver is attempting to avoid something. In either case, the ESC system may operate differently. For example, when the vehicle is being operated to not follow the path of the road geometry, the ESC system would modify the vehicle operation more aggressively.

In addition to being used to determine a driver's intention, map data that indicates the road geometry can also be used by the ESC system as part of the vehicle recovery strategy. For example, the ESC system can factor in an upcoming curve radius into a vehicle recovery strategy. As an example, if the ESC determines that the vehicle should follow a curved path and the map data indicates that the road ahead is sharply curved, the ESC recovery strategy may further modify the vehicle operation to include speed reduction, i.e., through use of the throttle actuator.

Slope. Map data that indicates the slope of the road may be used by the ESC system. For example, the readings from the sensors can be adjusted to account for any slope of the road, and to rectify a temporary corruption of any other involved sensor due to an instantaneous change in slope. Further, the slope of the road can be used to determine the driver's intention. For example, if the vehicle is approaching a downhill slope and the brakes are applied, the ESC system may assume that application of the brakes was intentional. Likewise, map data that indicates the slope of the road may be used by the ESC system to determine a recovery strategy. For example, if the vehicle is heading downhill, the ESC recovery strategy may apply the brakes with greater force and sooner compared to when the vehicle is heading uphill.

Speed limit Map data that indicates the speed limit of the road at and ahead of the vehicle position may be used by the ESC system. For example, if the vehicle is being operated above the posted speed limit, the ESC system may assume that speeding accounts for differences between actual vehicle operation and intended vehicle operation and therefore modify the vehicle operation accordingly. For example, under these circumstances, the ESC system may favor adjusting the throttle to slow down the vehicle rather than adjusting the brakes to avoid slippage.

Lanes. Map data that indicates the number, location, direction and width of lanes may be used by the ESC system to determine a driver's intention and to determine how to modify vehicle operation, if needed. For example, a rapid swerve while a vehicle is being driven in a right hand lane may indicate a driver's attempt to avoid an obstacle directly ahead. A recovery action commanded by the ESC system might avoid allowing the vehicle to travel into a lane moving in the opposite direction.

Surface. Map data that indicates the road surface at and ahead of the vehicle position may be used by the ESC system. For example, if the vehicle is being operated on a gravel surface or is approaching a gravel surface, the ESC system would begin correcting slippage sooner and more aggressively than on a concrete or asphalt surface.

Friction. Map data that indicates the friction of the road at and ahead of the vehicle position may be used similarly as the surface information as noted above.

Shoulders. Map data that indicates the presence, size and surface composition of a shoulder of the road may be used by the ESC system. For example, if the vehicle is about to slip off the road onto a shoulder composed of loose gravel, the ESC system would apply more aggressive correction than if the shoulder were composed of a more solid material. In another example, if the map data indicates that no shoulder exists at all, the ESC system would increase its recovery action to prevent the vehicle from travelling off the road.

Guard rails and Center Medians. Map data that indicates the presence of guard rails and center medians along the road may be used like the shoulder information. above.

Superelevation. Map data that indicates the superelevation (banking) along a road may be used by the ESC system. The degree of superelevation directly affects whether and how much a vehicle will slip in a curve. Therefore, the more positive superelevation a road has, the less aggressively the ESC would have to operate to enhance the driver's control of the vehicle. For example, if a vehicle is slipping in a curve and the map data indicates that the superelevation of the road increases directly ahead of the vehicle position, the ESC system may operate less aggressively because the road's superelevation would be expected to contribute to reducing slippage.

V. Example

A test analysis was conducted by National Advanced Driving Simulator (NADS) at the University of Iowa. The purpose was to test and evaluate the benefits of digital map technology applied to the design of ESC systems. The specific map attributes chosen were road curvature, road width, bank angle, and road slope. The NADS-developed model only models ESC and not ABS nor TCS.

This test focused on the performance of the ESC system itself by removing a live driver from the loop and providing a repeatable set of pre-recorded driver responses in the form of a double-lane-change maneuver stimulated by a sudden lane incursion event. Thus the experiments were run in an offline mode that did not require a human driver. The map data from a NAVTEQ ADAS Research Platform (ADAS RP) was integrated into the NADS MiniSim PC-based simulator; and the simulations were controlled by steering and speed controllers with steering events injected as disturbances.

Figure 5:
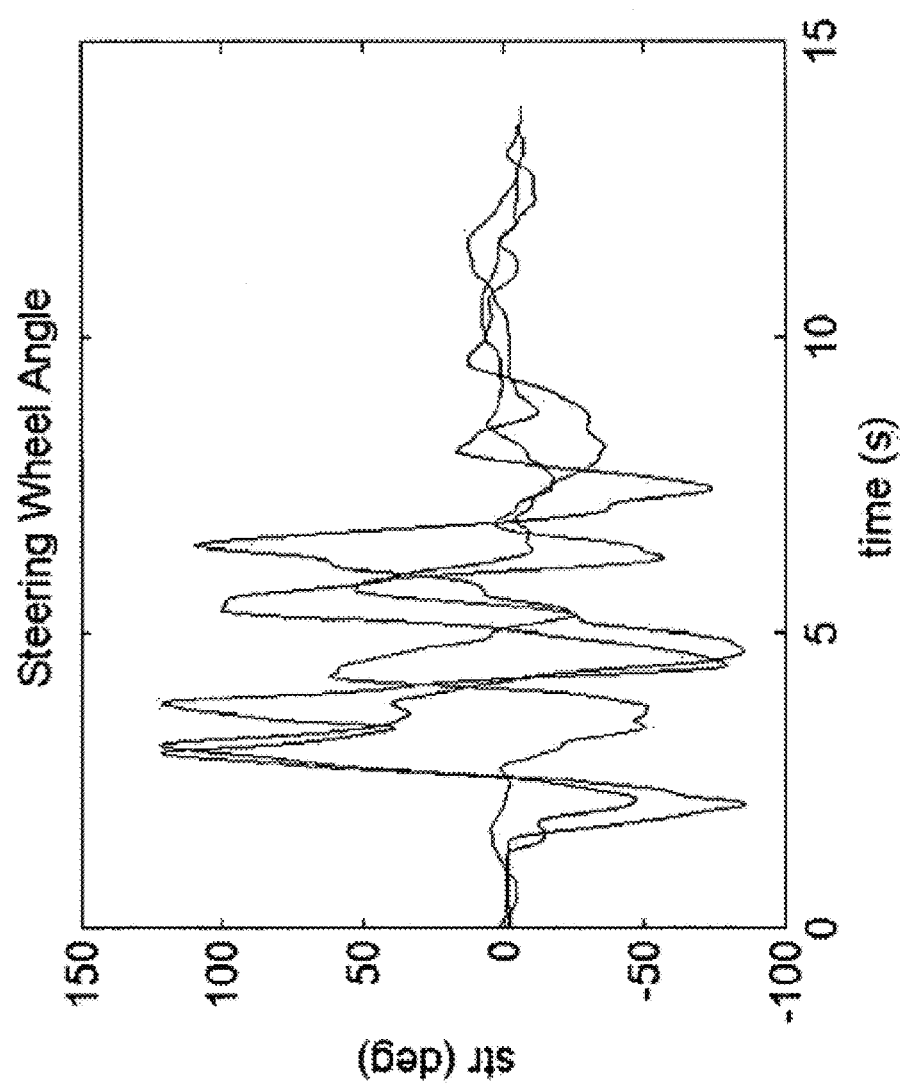
FIG. 5 is a graph that shows a set of three steering inputs.

The driver inputs used in the simulations were extracted from previous NADS ESC research that did use human drivers and elicited avoidance steering maneuvers. These steering inputs were applied to a variation of road types at a variety of speeds. A basic cruise control maintained the vehicle speed, while a lane tracking steering controller provided the basis of a closed-loop steering system, with the recorded steering profiles treated as disturbances. A set of three of the steering inputs is shown in FIG. 5, and illustrates the degree of variation in the steering command between drivers reacting to the same event. A total of 67 right incursion steering events were collected for use in this study.

An experimental design was created to evaluate the benefits of enhancing ESC systems with digital map information. The conditions include a baseline (no ESC), standard ESC, and digital map-enhanced ESC (possibly more than one), as well as the OEM ESC system for validation purposes. Furthermore, within each condition various speeds were run; and all conditions and speeds were simulated in multiple scenarios. A friction coefficient of 0.3 was used on all roads to obtain the clearest contrast between the conditions.

Four scenarios were designed from situations in which digital map information could be expected to improve the performance of an ESC algorithm. They include: a positively banked right curve, a negatively banked right curve, a downhill slope, and a narrow road. The complete set of steering inputs was run in each scenario. Additionally, drives with no steering disturbance were done at higher speeds on the curve scenarios. Triggers were embedded in each scenario so that the steering disturbance occurred at the same spot on the road regardless of the speed. The independent variables were ESC condition, scenario, and vehicle speed. Three of the dependent variables which revealed interesting comparisons between conditions were lane deviation, yaw rate error, and slip angle error.

The experiment used a three-factor factorial design. Each run was conducted 67 times, with steering inputs taken from actual driver recordings. The set of steering inputs was fixed, the dynamics model was deterministic, and there was no human interaction in the study. This removed the requirements for randomization and blocking that are normally built into the design of experiments. Due to the large number of simulation runs that resulted from this design, batch processes and automated analysis scripts were developed to help provide efficient and error-free processing.

Path Follower

A path-following steering controller was developed to automatically provide appropriate steering inputs during a scenario drive. The path was obtained by driving manually through each scenario at a low speed and saving the vehicle position trace as path data. The study drives were then controlled to follow the pre-recorded path at various speeds and in the presence of steering disturbance inputs. The overall steering signal was a combination of a feed-forward component, a feedback controller component, and a disturbance component. The path follower approach was similar to the goal point approach described by Sidhu et al. (A. Sidhu, D. R. Mikesell, D. A. Guenther, R. Bixel and G. Heydinger, "Development and Implementation of a Path-Following Algorithm for an Autonomous Vehicle," vol. SP-2138, 2007), except for the open loop components which were indexed by distance traveled, with the disturbance input being triggered also by distance.

Road Selection

Two road sections were located in the North American NAVTEQ database that would satisfy the requirements of the scenarios. Road curvature and slope attributes were used from the digital map database, while road width and bank angle were synthesized.

The first road segment chosen was a section of Dubuque Street north of Iowa City, in North Liberty. This section of road was used for both of the curve scenarios, as well as the road width scenario. The direction of travel in each of these scenarios is northwest to southeast. Both curve scenarios are mapped to the same physical curve in the database, but synthesized with different bank angles. The first curve to the right, travelling in the southeasterly direction, was used for the curves. Its radius of curvature goes down to a minimum of approximately 400 ft. The second road was a section of Highway 61 near Dubuque. This road has a grade of 6% in places, the maximum allowed on most roads, making it a good candidate for the slope scenario.

Data Analysis

A complete set of engineering data was collected from each run. This data included vehicle dynamics variables, control signals, digital map attribute variables, and ESC system variables. The large amount of engineering data was reduced to obtain a descriptive set of metrics that characterize the performance of the vehicle with the ESC system in the condition being tested. A statistical analysis was then applied to the reduced data to test for significant differences in the performance of the ESC systems, with the baseline condition of "no ESC" as a control case.

The main dependent variables were based on the lane deviation, yaw rate error, and slip angle. Lane deviation refers to the magnitude of the excursion from an "ideal" path that was manually recorded at a slow speed. The lane deviation decay is the slope between the two measured lane deviation peaks, calculated as the difference between the peaks divided by the distance, in feet, separating the peaks. Therefore, a negative decay represents stability, while a positive decay indicates increasing oscillations and instability. The slip angle is the angle between the wheel steer angle at the front axle and the velocity vector of the car. The yaw rate error is the difference between the yaw rate predicted by the ESC car model and the yaw rate measured from the vehicle dynamics.

The analysis utilized SAS statistical software where the mixed methods procedure for analysis of variance was used (SAS Institute, Inc., "SAS OnlineDoc, version 8", http://v8doc.sas.com/sashtml, 1998). The mixed methods procedure assumes a normal distribution. All statistical models included the ESC algorithm as the independent variable with each of the dependent variables described above. The same analyses were completed across all road types for each speed condition. A significance level of p=0.1 was used with significant p-values shaded in the results tables.

Results

Many curved roads have a bank angle that tilts the car towards the inside of the curve, referred to as a normally banked or positively banked road, to differentiate it from the negative bank that was also tested in the study. The positive bank scenario uses a curve with a radius of 400 feet and a bank of 3%. A set of 67 steering inputs was used at speeds from 54 mph to 60 mph. The steering disturbance was triggered near the point of maximum curvature. The set of ESC conditions runs consist of the following: baseline (No ESC), OEM ESC (OEM), NADS ESC model (ESC), and ADAS enhancement (ADAS). Additional runs were made at higher speeds with no steering disturbance. In addition to the formerly mentioned ESC conditions, an additional ADAS enhancement was added with curve look-ahead (ADAS LA) introducing engine throttle modulation.

Figure 6:
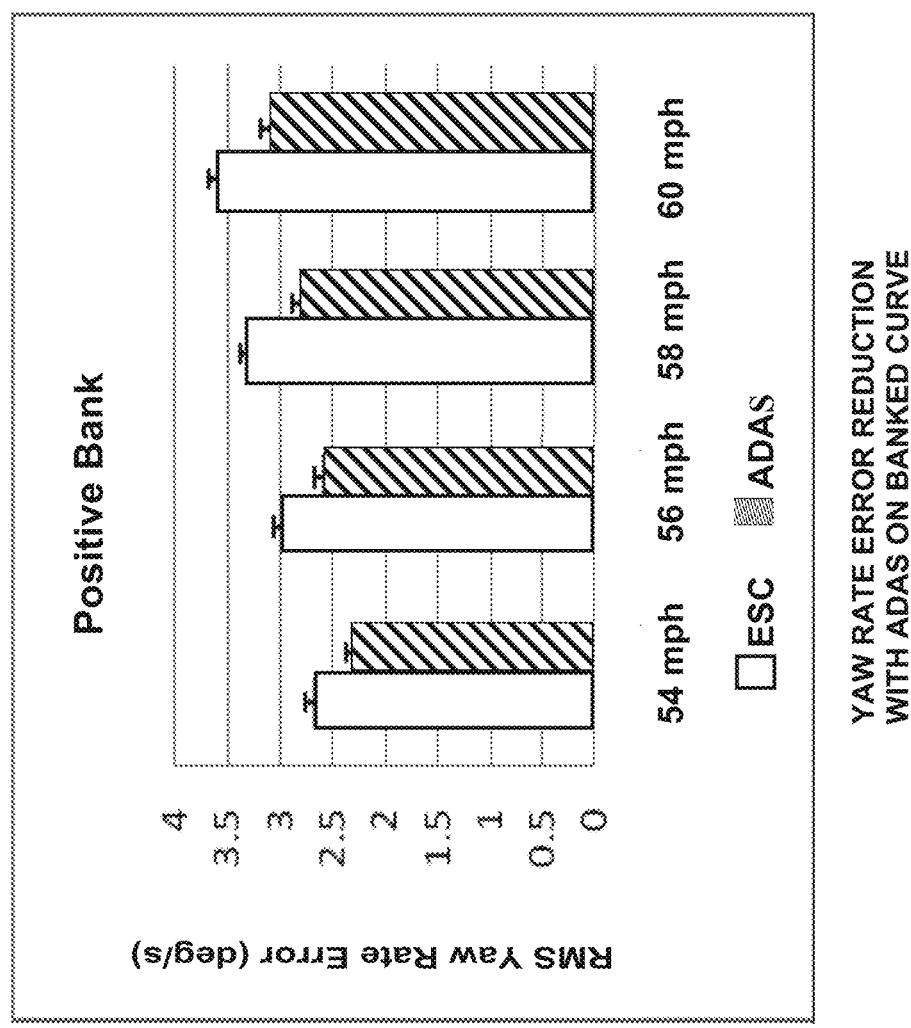
FIG. 6 is a graph that shows yaw rate error reduction on banked curve in an ESC system equipped with map data.

All tested speeds produced statistically significant differences in RMS yaw rate error between the nominal ESC algorithm and the ADAS enhancement. The yaw rate error was plotted for the four speeds that were statistically analyzed in FIG. 6. The error bars mark the 95% confidence intervals for the data sets that each bar represents.

The ADAS enhancement is better able to control the yaw rate error in the simulated range of speeds. Referring to the peak value of the first lane deviation for each of the steering inputs, in each plot, the independent samples have been reordered monotonically using the ESC condition. The vertical axis has been limited and may not show some values if they exceed the axis limit Generally, larger lane deviation magnitudes are associated with larger and/or quicker steering inputs. It is evident then that the 67 steering inputs represent a wide range of driver steering patterns.

A typical modern road would be expected to have 12-foot-wide lanes and 10-foot-wide shoulders. Assuming a six-foot-wide car, one may estimate that a tire would leave the road on the right at a lane deviation of three feet and leave the shoulder on the right at a lane deviation of 13 feet.

Figure 8:
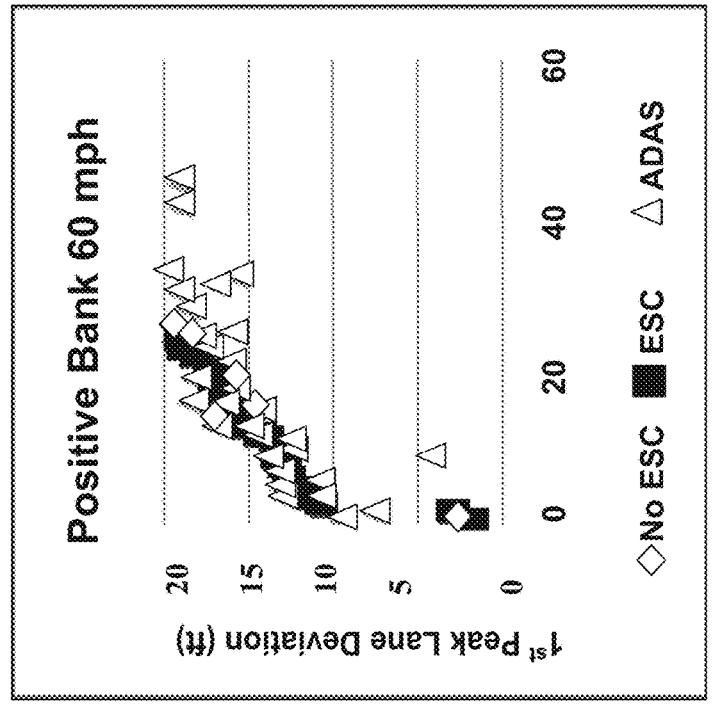
FIG. 8 is a graph that shows primary lane deviation peaks in a positive bank at 60 mph.
Figure 7:
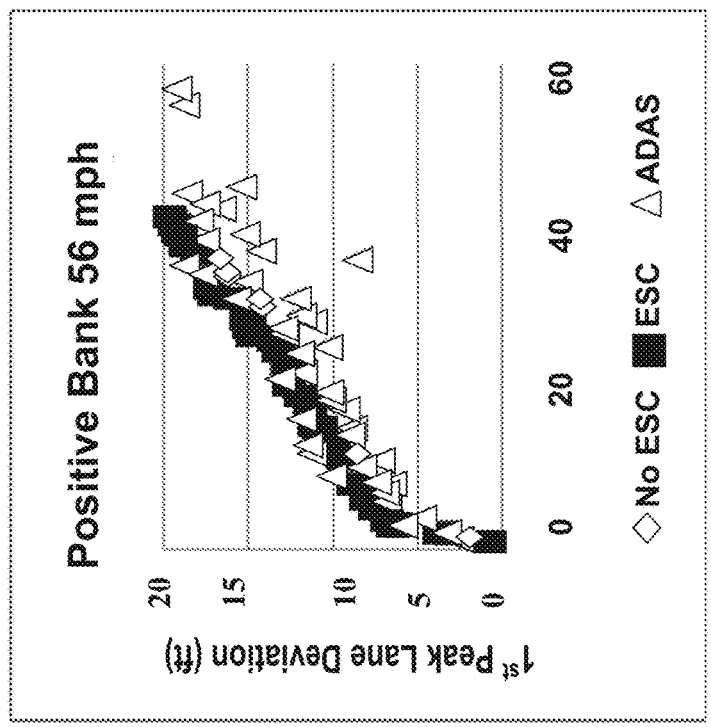
FIG. 7 is a graph that shows primary lane deviation peaks in a positive bank at 56 mph.

FIG. 7 shows the peak lane deviations at 56 mph. The ADAS enhancement reduced many of the values by two feet or more. A few samples can be identified in which the ADAS condition actually prevented lane or shoulder departure while the ESC condition did not. FIG. 8 shows the peak lane deviations at 60 mph. The values quickly exceed the limit of the chart axis, but a clear trend of ADAS effectiveness is observed. The larger improvements are observed for the more severe cases.

A statistical analysis was done using the RMS yaw rate error, RMS slip angle, RMS lane deviation, and lane deviation decay. All speeds show strong statistical differences in yaw rate error between the ESC and ADAS conditions, as shown in Table 1 in FIG. 9. Moreover, there appears to be a trend towards significance as the speed increases. The other three measures also show trends towards significance as the speed increases, though the lane deviation measures weaken some at 60 mph.

Curve Look-Ahead

Four higher speeds were run without any steering disturbance applied. As a result, no statistical analysis is necessary for these runs. An additional ADAS enhancement, ADAS LA was added, in which the engine throttle was cut by the system when it anticipated an approaching curve, and the predicted lateral acceleration would be excessive.

Figure 11:
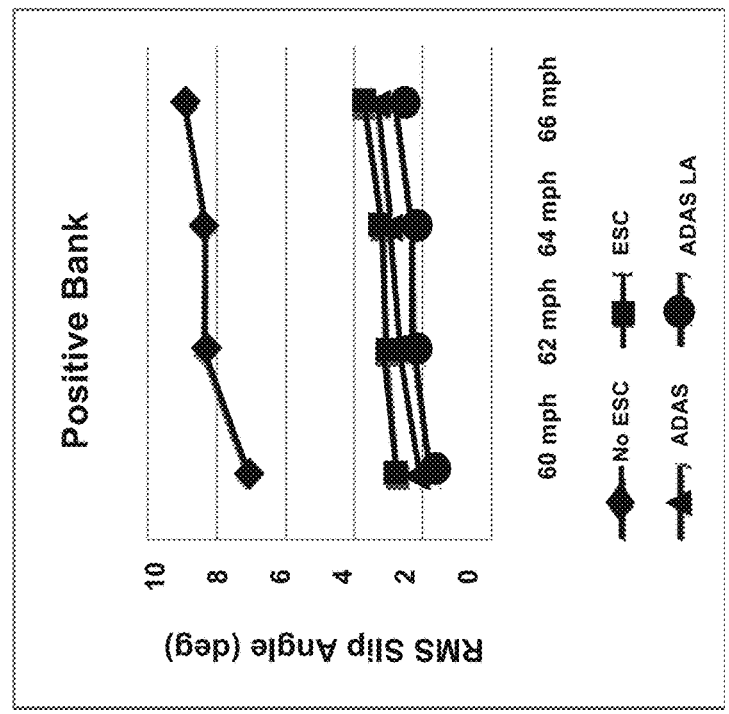
FIG. 11 is a graph that shows RMS slip angle in a positive bank at various speeds.
Figure 10:
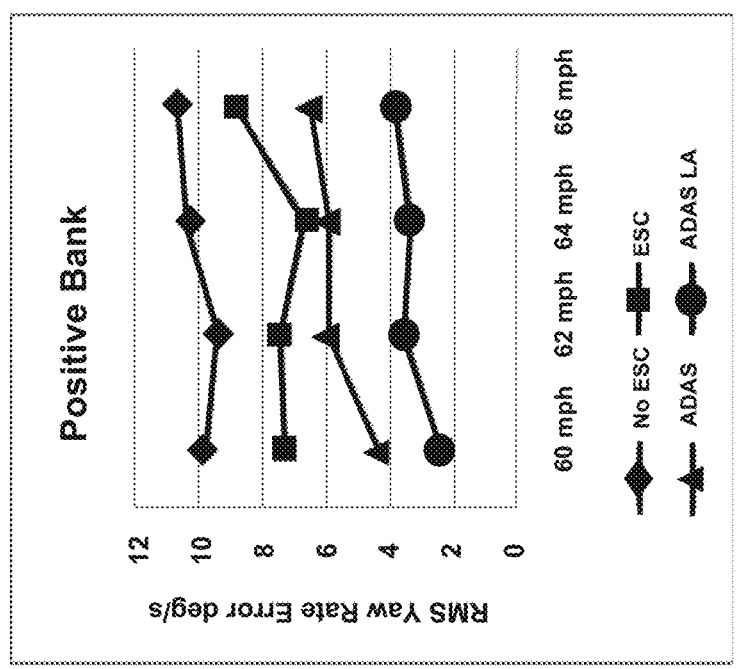
FIG. 10 is a graph that shows RMS yaw rate error in a positive bank at various speeds.
Figure 13:
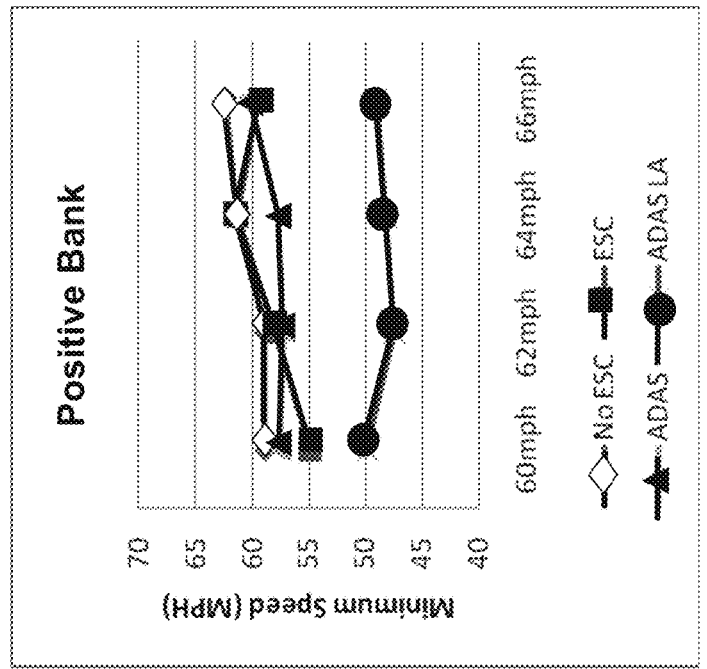
FIG. 13 is a graph that shows minimum event velocity in a positive bank at various speeds.
Figure 12:
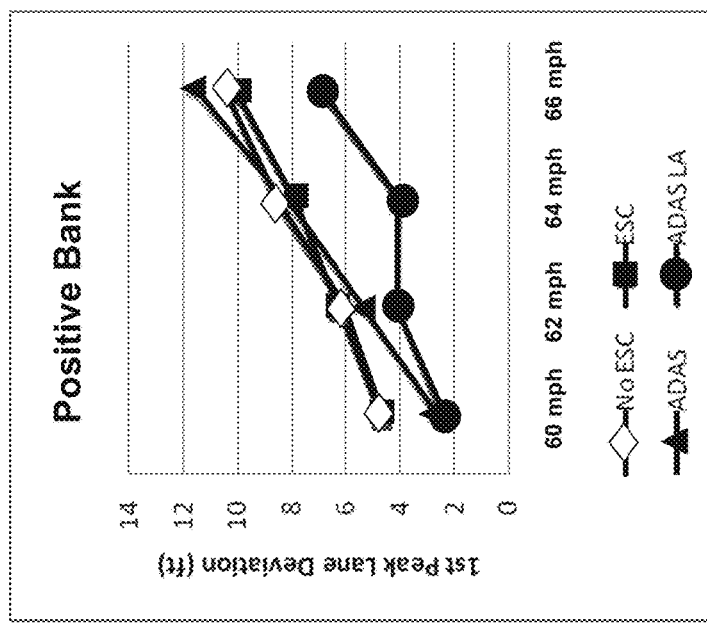
FIG. 12 is a graph that shows primary lane deviation peak in a positive bank at various speeds.

FIGS. 10 and 11 show the yaw rate error and slip angle for the four speeds. A clear ranking is evident from these charts and places the ADAS LA enhancement ahead of the rest. FIG. 12 shows the peak lane deviation for the four speeds. Again, the ADAS LA enhancements show significant improvement in lane deviation performance. The primary reason for the improvement in ADAS LA performance can be traced to the throttle override's ability to mitigate the speed of the car coming into the curve, as shown in FIG. 13.

VI. Further Alternatives

Figure 14:
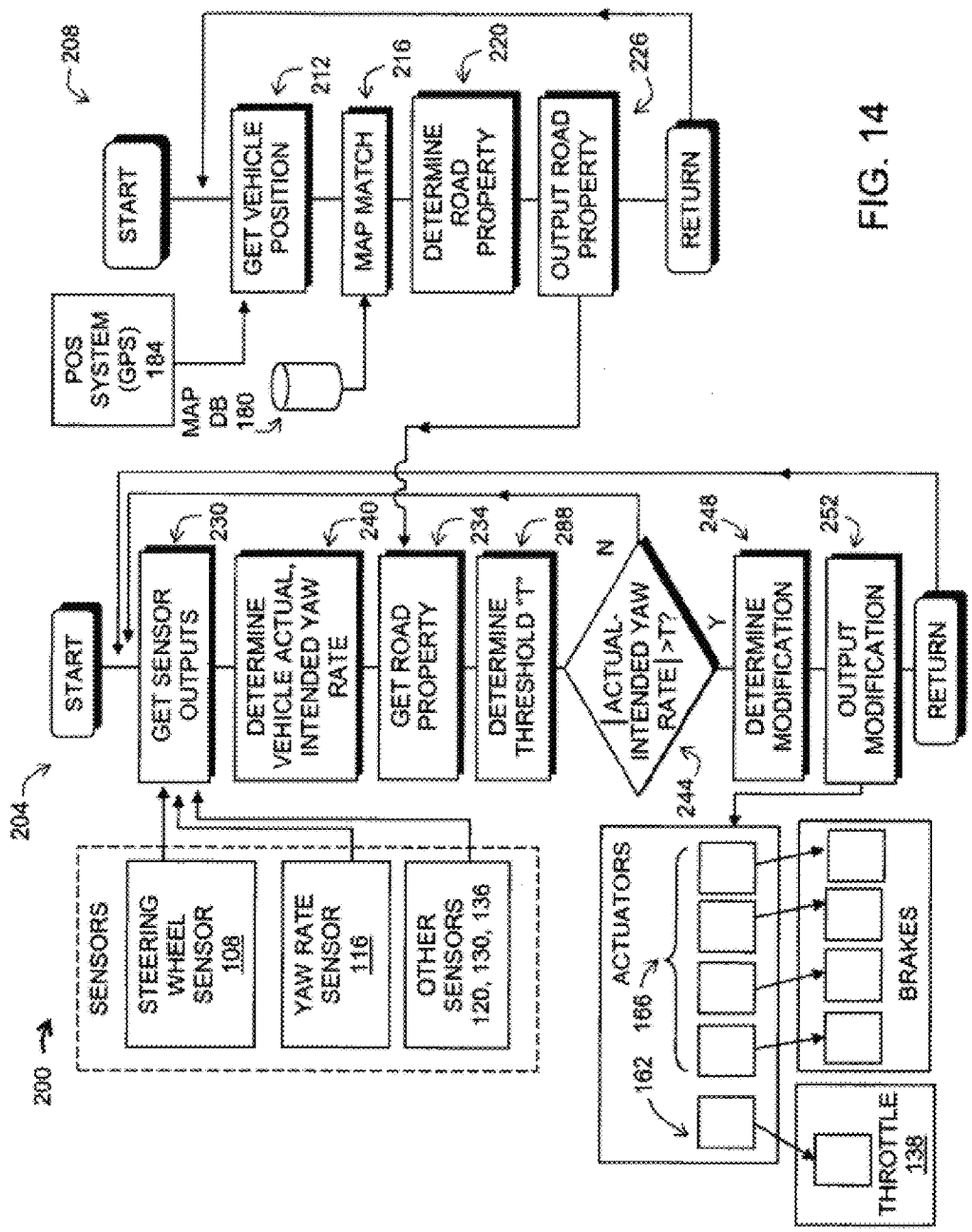
FIG. 14 is a flowchart of an alternative embodiment of the process performed by the Electronic Stability Control system of FIG. 1.

FIG. 14 is another flowchart that shows an alternative embodiment of the process performed by the Electronic Stability Control system of FIG. 1. The ESC process 204 in FIG. 14 includes some of the same steps as the ESC process shown in FIG. 3, and like steps are indicated by the same numerals.

FIG. 14 shows a modification to the ESC process 204 in which the road property obtained from the positioning process 208 is used to determine the value of the threshold, T (Step 288). This threshold T is then used in the step in which the actual yaw rate is compared to the intended yaw rate (Step 244). As an example of how this would be applied, if the vehicle were being operated on a curved road, the threshold T would be reduced accordingly. Then, the ESC application would initiate a recovery modification at a lower difference threshold between the actual yaw rate and the intended yaw rate compared to when the vehicle was being operated on a road that was not curved.

FIG. 15 shows a diagram of a portion of one or more further alternative embodiments of an ESC System 302 that incorporates map data. The portion of the ESC system 302 shown in FIG. 15 includes some components that are the same or similar to those shown in FIG. 1, and like components are indicated by like numerals.

As in the embodiments described above, the ESC application 150 on the ECU 144 provides an output via the hydraulic control unit 156 to operate the throttle actuator 162 to control the throttle. Further, the ESC application 150 provides an output via the hydraulic control unit 158 to operate actuators 166 associated with the vehicle brakes to control individual vehicle brakes.

The ESC system 302 in FIG. 15 controls one or more additional vehicle systems and/or operating parameters. These systems and/or operating parameters include steering 330(1), chassis spring rate 330(2), chassis roll rate 330(3), jounce damping rate 330(4), rebound damping rate 330(5), transmission gear selection 330(6), transmission torque converter coupling 330(7), brake boost level 330(8), wheel camber 330(9) and wheel caster 330(10). Each of these systems and/or operating parameters (collectively 330) may be associated with a corresponding actuator, 340(1), 340(2), 340(3), 340(4), 340(5), 340(6), 340(7), 340(8), 340(9), and 340(10), respectively. These actuators (collectively 340) may be each associated with a corresponding hydraulic control unit 350, or alternatively, some or all the actuators may be controlled from a signal directly from the ECU 144.

In the case of each of the additional vehicle systems and/or operating parameters, the ESC application 150 uses information from the map database 180 for determining an appropriate modification to make to the actual vehicle operation. This modification may be determined or calculated at a step (e.g., Step 248 in FIG. 4) of the process 200 as part of a recovery action. As an example, the ESC application may adjust (e.g., tighten) the chassis spring rate, chassis roll rate, jounce damping rate, rebound damping rate or the transmission torque converter coupling based on information from the map database 180, such as that the road ahead of the vehicle is sharply curved or sloped. Alternatively, the ESC application may adjust transmission gear selection, brake boost level, wheel camber and/or wheel caster based on information from the map database.

Embodiments of the ESC system do not necessarily have to control all the vehicle systems and/or vehicle operating parameters shown in FIG. 15. In alternative embodiments, the ESC system may control only one or less than all the vehicle systems and/or vehicle operation parameters shown in FIG. 15. Furthermore, other vehicle systems and/or vehicle operation parameters, in addition to those shown in FIG. 15, may be controlled by embodiments of the ESC system.

CONCLUSIONS

Reasonable and conservative adaptations were implemented to a traditional ESC system to take into account additional road information available from a digital map system. These modifications were tested with 67 real-world steering inputs, at various speeds, and on different types of roads on which improved performance may reasonably be expected. In all cases, the RMS yaw rate error was significantly reduced using the ADAS-enhanced algorithm over the traditional ESC system with generally improved lane deviation as well. In the opinion of the researchers, the challenge in achieving significance in some of the measures is caused, in large part, by the wide range of severity in the steering inputs, resulting in large variances in the data. Larger sample sizes would be expected to increase the significance of the results.

ADAS enhancements alter the trade-off between ESC performance and driver "feel" by moving the tuning of a typical algorithm to a more aggressive stance. Therefore, it is not surprising that the benefits of ADAS-enhanced ESC are apparent in more extreme maneuvers and at higher speeds that may challenge both drivers and traditional ESC systems. Digital map data can help the ESC system identify dangerous driving environments and make the system more aggressive in a timely or even predictive fashion.

The thrust of this research was to make use of traditional ESC control techniques and adjust the tuning in response to digital map attribute data; however, the use of ADAS technology opens many new opportunities to the algorithm designer. Knowledge of the road curvature allows the system to make estimations about driver intent by comparing the known curvature with the predicted vehicle path calculated from the car's steering input and/or yaw rate. If there is data that indicates the driver is not following the designated roadway path, the system may attempt to classify the driver's responses as emergency avoidance or driver impairment, and respond with an appropriate control strategy (see for example (I. Dagli, M. Brost and G. Breuel, "Action Recognition and Prediction for Driver Assistance Systems Using Dynamic Belief Networks," Agent Technologies, Infrastructures, Tools, and Applications for E-Services, pp. 179-194, 2009.))

Digital map data can beneficially be used to adjust the authority of the ESC system in response to road conditions and vehicle speed. Parameter tuning that provides effective yet comfortable ESC performance in normal situations is different from a tuning that would be more helpful in dangerous situations. Map-enhanced ESC has been shown to provide a significant performance boost in certain realistic situations.

In the methods of operation disclosed above, fewer or more steps or acts may be provided, and a combination of steps may be provided. Also, the steps or acts may be performed in the order as shown or in a different order. The method is implemented by the system and/or devices described herein or by different devices or systems. One or more steps or processes of the method may be fully or partially automated (such as via a computer or algorithm).

The logic, data, software, or instructions for implementing the systems, processes, methods and/or techniques discussed above are provided on computer-readable storage media or memories or other tangible media, such as a cache, buffer, RAM, removable media, hard drive, other computer readable storage media, or any other tangible media. The tangible media include various types of volatile and non-volatile storage media. The functions, acts, steps, or tasks illustrated in the figures described herein are executed in response to one or more sets of logic or computer-executable instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU") or system.

The foregoing description of an implementation has been presented for purposes of illustration and description. It is not exhaustive and does not limit the claimed inventions to the precise form disclosed. Modifications and variations are possible in light of the above description or may be acquired from practicing the invention. Note also that the implementation may vary between systems. The claims and their equivalents define the scope of the invention.

We claim:

1. A method comprising:
   determining, by a processor, a location and direction of travel of a vehicle along a road in a road network;
   determining, by the processor, a property of the road ahead of the location of the vehicle which will one of assist or counter the operation thereof;
   obtaining, by the processor, an output from at least one sensor configured to sense at least one aspect of operation of the vehicle and generate a signal indicative thereof;
   determining, by the processor based on the output from the at least one sensor, how the vehicle is actually being operated;
   determining, by the processor, whether actual operation of the vehicle is consistent with the property of the road ahead of the location of the vehicle to assist or counter the operation thereof, wherein the operation of the vehicle is determined to be intended when the actual operation of the vehicle is consistent with the property of the road ahead of the location of the vehicle to assist or counter the operation thereof; and
   exerting control, by the processor, over the operation of the vehicle in accordance with the determination whether actual operation of the vehicle is consistent with the property of the road ahead of the location of the vehicle to assist or counter the operation thereof.

2. The method of claim 1 wherein the processor determines the property of the road ahead of the location of the vehicle by using the determined location and direction of travel.

3. The method of claim 1 wherein the property of the road ahead of the location of the vehicle comprises road position, road shape, number of lanes, road width, road height, road slope, road friction, road surface, presence of a road shoulder, superelevation, presence of a black spot, presence of guard rails, presence of a road median, speed limit information, curvature, or combinations thereof.

4. The method of claim 1 wherein the determination of how the vehicle is actually being operated further comprises determining, based on the at least one aspect sensed by the at least one sensor, that the brakes are being applied, that the accelerator is being applied, that the steering wheel is being turned, that a transmission gear is being selected, or combinations thereof.

5. The method of claim 1 wherein the determining of the property of the road ahead further comprises accessing, by the processor, a map database to determine a property of the road ahead of the location of the vehicle.

6. The method of claim 5 wherein the map database is part of a navigation system.

7. The method of claim 5 wherein at least a portion of the map database is located remotely from the vehicle and coupled via a wireless communications network.

8. The method of claim 1 wherein the road ahead of the location of the vehicle is determined based on identification of a most-likely path from among a multiplicity of roads that the vehicle could travel onto.

9. The method of claim 1 wherein the road ahead of the location of the vehicle extends out ahead of the vehicle to an extent, the extent based on distance, time to travel, posted speed limits, actual vehicle speed, or combinations thereof.

10. The method of claim 1 wherein the determination that the operation of the vehicle is intended further comprises determining, based on the at least one aspect sensed by the at least one sensor, that the brakes are applied when the property of the road ahead of the location of the vehicle indicates a downhill, that the accelerator is applied when the property of the road ahead of the location of the vehicle indicates an uphill, that the accelerator is not applied when the property of the road ahead of the location of the vehicle indicates a downhill, that the steering wheel is being turned in a particular direction when the property of the road ahead of the location of the vehicle indicates a curved path in the particular direction, that the steering wheel is not being turned when the property of the road ahead of the location of the vehicle indicates a straight path, or a vehicle speed consistent with a speed limit specified by the property of the road ahead of the location of the vehicle.

11. The method of claim 1 wherein determining whether actual operation of the vehicle is consistent with the property of the road ahead of the location of the vehicle further comprises determining that the operation of the vehicle is unintended when the actual operation of the vehicle is not consistent with the property of the road ahead of the location of the vehicle to assist or counter the operation thereof.

12. The method of claim 11 wherein the determination that the operation of the vehicle is unintended further comprises determining that an operator of the vehicle is drowsy.

13. The method of claim 11 wherein the determination that the operation of the vehicle is unintended further comprises determining, based on the at least one aspect sensed by the at least one sensor, that the brakes are applied when the property of the road ahead of the location of the vehicle indicates an uphill, that the brakes are not applied when the property of the road ahead of the location of the vehicle indicates a downhill, that the accelerator is applied when the property of the road ahead of the location of the vehicle indicates a downhill, that the steering wheel is being turned when the property of the road ahead of the location of the vehicle indicates a straight path, that the steering wheel is not being turned when the property of the road ahead of the location of the vehicle indicates a curved path, that the steering wheel is being turned in a particular direction when the property of the road ahead of the location of the vehicle indicates a curved path in a direction opposite the particular direction, a high vehicle speed when the property of the road ahead of the location of the vehicle indicates a speed limit different than the vehicle speed, or a rapid change in speed or direction of the vehicle when the property of the road ahead of the location of the vehicle indicates a low friction surface.

14. The method of claim 11 further comprising determining whether to provide an output via at least one output to control an actuator coupled therewith configured to control at least one aspect of operation of the vehicle.

15. The method of claim 14 further comprising determining at least one of an amount or rate by which the at least one aspect of operation of the vehicle is controlled via the at least one actuator.

16. The method of claim 14 wherein the property of the road ahead of the location of the vehicle to one of enhance or counter the operation thereof is used to adjust the control of the at least one aspect of operation of the vehicle in response to road conditions and vehicle speed.

17. The method of claim 14 wherein the at least one actuator comprises a brake actuator, a throttle actuator, a steering actuator, vehicle chassis spring rate actuator, vehicle chassis roll rate actuator, wheel jounce damping rate actuator, wheel rebound damping rate actuator, vehicle transmission gear selection actuator, vehicle transmission torque converter coupling actuator, vehicle brake boost level actuator, vehicle wheel camber actuator, vehicle wheel caster actuator, or combinations thereof.

18. The method of claim 1 wherein the exerting further comprises determining, by the processor, a recovery strategy to modify the operation of the vehicle when the actual operation of the vehicle is not consistent with the property of the road ahead of the location of the vehicle to assist or counter the operation thereof, wherein an extent of the modification to the operation of the vehicle is based upon the extent to which the property of the road ahead of the location of the vehicle to assist or counter the operation thereof, itself, will cause a modification to the operation of the vehicle.

19. The method of claim 18 wherein the recovery strategy comprises modification of the operation of the vehicle to apply the brakes with greater force and sooner when the property of the road ahead of the location of the vehicle indicates a downhill than would be applied if the property of the road ahead of the location of the vehicle was an uphill.

20. The method of claim 18 wherein the recovery strategy comprises modification of the operation of the vehicle to adjust the throttle of the vehicle to slow down the vehicle rather than adjust the brakes when the property of the road ahead of the location of the vehicle indicates a low friction surface than would be applied if the property of the road ahead of the location of the vehicle indicates a high friction surface.

21. The method of claim 18 wherein the recovery strategy comprises modification of the operation of the vehicle to correct slippage later and less aggressively when the property of the road ahead of the location of the vehicle indicates a road surface comprising concrete or asphalt.

22. The method of claim 18 wherein the recovery strategy comprises modification of the operation of the vehicle to prevent the vehicle from travelling off road when the property of the road ahead of the location of the vehicle indicates a road with no guard rails, no shoulders or no median.

23. The method of claim 18 wherein the recovery strategy comprises less aggressive modification of the operation of the vehicle to correct slippage when the property of the road ahead of the location of the vehicle indicates a road super-elevation which would be expected to contribute to reducing slippage.

24. A system, comprising:
means for sensing an aspect of operation of a vehicle and generating a signal indicative thereof;
means for receiving information indicating the position and direction of travel of the vehicle on a road and a property of the road upon which the vehicle is located that is ahead of the position of the vehicle which will one of assist or counter the operation thereof;
means for determining, coupled with the means for sensing, how the vehicle is actually being operated based on the signal indicative of the aspect of operation of the vehicle; and
means for determining whether actual operation of the vehicle is consistent with the property of the road upon which the vehicle is located that is ahead of the position of the vehicle to assist or counter the operation thereof, wherein the operation of the vehicle is determined to be intended when the actual operation of the vehicle is consistent with the property of the road upon which the vehicle is located that is ahead of the position of the vehicle to assist or counter the operation thereof; and
means for exerting control over the operation of the vehicle in accordance with the determination whether actual operation of the vehicle is consistent with the property of the road ahead of the location of the vehicle to assist or counter the operation thereof.

25. The system of claim 24 wherein the property of the road upon which the vehicle is located that is ahead of the position of the vehicle is based on the determined position and direction of travel of the vehicle on the road.

26. The system of claim 24 wherein the means for determining how the vehicle is actually being operated further comprises a means for determining, coupled with the means for sensing, that the brakes are being applied, that the accelerator is being applied, that the steering wheel is being turned, that a transmission gear is being selected, or combinations thereof.

27. The system of claim 24 wherein the means for determining whether actual operation of the vehicle is consistent with the property of the road upon which the vehicle is located that is ahead of the position of the vehicle to assist or counter the operation thereof further comprises determining that the operation of the vehicle is unintended when the actual operation of the vehicle is not consistent with the property of the road upon which the vehicle is located that is ahead of the position of the vehicle.

28. The system of claim 27 wherein the determination that the operation of the vehicle is unintended further comprises determining that an operator of the vehicle is drowsy.

29. The system of claim 24 wherein the means for exerting further comprises means for controlling at least one aspect of operation of the vehicle and means for determining a recovery action to modify the operation of the vehicle when the actual operation of the vehicle is not consistent with the property of the road upon which the vehicle is located that is ahead of the position of the vehicle to assist or counter the operation thereof, wherein the means for determining a recovery action is based upon an extent to which the property of the road upon which the vehicle is located that is ahead of the position of the vehicle to assist or counter the operation thereof will, itself, cause a modification to the operation of the vehicle.

* * * * *